(12) United States Patent
Hilerio et al.

(10) Patent No.: US 7,277,863 B1
(45) Date of Patent: Oct. 2, 2007

(54) ELECTRONIC MARKETPLACE COMMUNICATION SYSTEM

(75) Inventors: Israel Hilerio, Irving, TX (US); Vijayasarathy S. Chakravarthy, Irving, TX (US); Ajit Sagar, Coppell, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1045 days.

(21) Appl. No.: 09/592,775

(22) Filed: Jun. 13, 2000

(51) Int. Cl.
*G06Q 30/00* (2006.01)
*G06Q 90/00* (2006.01)

(52) U.S. Cl. .............. 705/10; 705/80; 705/1; 719/318

(58) Field of Classification Search ......... 719/318; 705/1–500
See application file for complete search history.

(56) References Cited

U.S. PATENT DOCUMENTS

| | | | |
|---|---|---|---|
| 5,414,838 A * | 5/1995 | Kolton et al. ........... 707/104.1 |
| 5,555,346 A * | 9/1996 | Gross et al. ............. 706/45 |
| 5,721,825 A * | 2/1998 | Lawson et al. ........... 709/203 |
| 5,751,914 A * | 5/1998 | Coley et al. ............ 706/47 |
| 5,778,357 A * | 7/1998 | Kolton et al. ........... 707/2 |
| 5,802,253 A * | 9/1998 | Gross et al. ............ 706/47 |
| 5,984,178 A * | 11/1999 | Gill et al. ............. 235/379 |
| 6,163,604 A * | 12/2000 | Baulier et al. .......... 379/189 |
| 6,279,826 B1 * | 8/2001 | Gill et al. ............. 235/379 |
| 6,285,989 B1 * | 9/2001 | Shoham ................. 705/37 |
| 6,493,755 B1 * | 12/2002 | Hansen et al. .......... 709/224 |
| 6,826,579 B1 * | 11/2004 | Leymann et al. ......... 717/131 |

FOREIGN PATENT DOCUMENTS

WO WO98/29822 A1 9/1998
WO WO99/07118 A1 11/1999

OTHER PUBLICATIONS

Beck, M. et al. "Active and Real-time Functionalities for Electronic Brokerage Design." Mar. 31, 1999.*
McCarthy, Dennis R. et al. "The Architecture of An Active Data Base Management System." ACM. 1989.*
Paton, Norman W. et al. "Active Database Systems." ACM Computing Surveys. Mar. 1999.*
Warne, John. "Event Management for Large-Scale Distributed Systems." Nov. 1, 1995.*
Konana, Prabhudev et al. "Design of Time Cognizant Electronic Brokerages." Apr. 1998.*

(Continued)

*Primary Examiner*—Lewis A. Bullock, Jr.
(74) *Attorney, Agent, or Firm*—Booth Udall, PLC (57) ABSTRACT

A communication system provides an exchange service between multiple companies. Messages between companies are routed through the exchange. These messages may represent any data or functionality desired by the companies. These messages may be requests, quotes, replies, and similar messages. Certain types of messages are designated as events to the exchange system. A portion of the exchange handles these events with rules, producing actions and additional events in response to occurrences consistent with the rules.

39 Claims, 4 Drawing Sheets

OTHER PUBLICATIONS

Chandra, Rakesh et al. "Managing Temporal Financial Data in an Extensible Database." VLDB Conference. 1993.*

Diaz, Oscar et al. "EXACT: an extensible approach to active object-oriented databases." VLDB Journal. 1997.*

Geppert, Andreas et al. "Market-Based Workflow Management." SpringerLink. Lecture Notes in Computer Science. 1998.*

Chakravarthy, Sharma et al. "ECA Rule Processing in Distributed and Heterogenous Environments." IEEE. Sep. 1999.*

Hilerio, Israel et al. "Herbal-T, Enabling Integration, Interoperability, and Reusability of Ineternet Components." ACM. 1999.*

Nikolaou, Christos et al. "Synthesis of Services in Open Commerce Environments." Citeseer. Mar. 1998.*

Marazakis, Manolis et al. "The Aurora Architecture for Developing Network-Centric Applications by Dynamic Composition of Services." 1997.*

Unknown, XP-002183866, "Automatic Processing of Meeting Notices," IBM Technical Disclosure Bulletin, vol. 34, No. 9, 2 pages, Feb. 1992.

Unknown, XP-002183867, "Technique for Electronic Data Interchange Supplier Simulation," IBM Technical Disclosure Bulletin, vol. 40, No. 3, 3 pages, Mar. 1997.

* cited by examiner

ELECTRONIC MARKETPLACE COMMUNICATION SYSTEM

BACKGROUND OF THE INVENTION

1. Field of the Invention

The present invention relates generally to communications systems and control for computer networks, and more specifically to an intelligent control system for use with a message exchange network.

2. Description of the Prior Art

The recent dramatic increases in communications bandwidth and capability are enabling businesses to work using techniques not previously available or contemplated. The high level of communication available between companies allow them to provide on-line, real-time manufacturing, ordering, and shipping control capabilities. The communications networks currently coming into place will allow companies to enter orders, receive responses, and perform other manufacturing and shipping related tasks as if two companies were directly linked and closely related.

High-level communications interconnectivity between companies allows them to establish relationships not hereto possible. Separate companies are beginning to establish communication links which allow them to cooperate much more closely with suppliers and customers. For example, systems currently coming into use are allowing companies to take an order for a customer, confirm availability of products from suppliers, and confirm to the customer a shipping date for the order. As a network available to everyone, the internet is the generally accepted vehicle for implementing these systems.

Linking between companies is still usually done on a one to one basis between the companies. It is necessary to establish a relationship between two companies, and determine a protocol whereby data may be shared between the companies and messages passed. This is relatively inefficient and redundant, and results in numerous companies creating the same or similar subsystems multiple times. It would be desirable to provide a central clearing house, or exchange, by which companies can communicate to each other. It would be desirable for such exchange to provide additional functionality and intelligence beyond merely passing messages between companies using the exchange.

SUMMARY OF THE INVENTION

In accordance with the present invention, a communication system provides an exchange service between multiple companies. Messages between companies are routed through the exchange. These messages may represent any data or functionality desired by the companies. These messages may be requests, quotes, replies, and similar messages. Certain types of messages are designated as events to the exchange system. A portion of the exchange handles these events with rules, producing actions and additional events in response to occurrences consistent with the rules.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
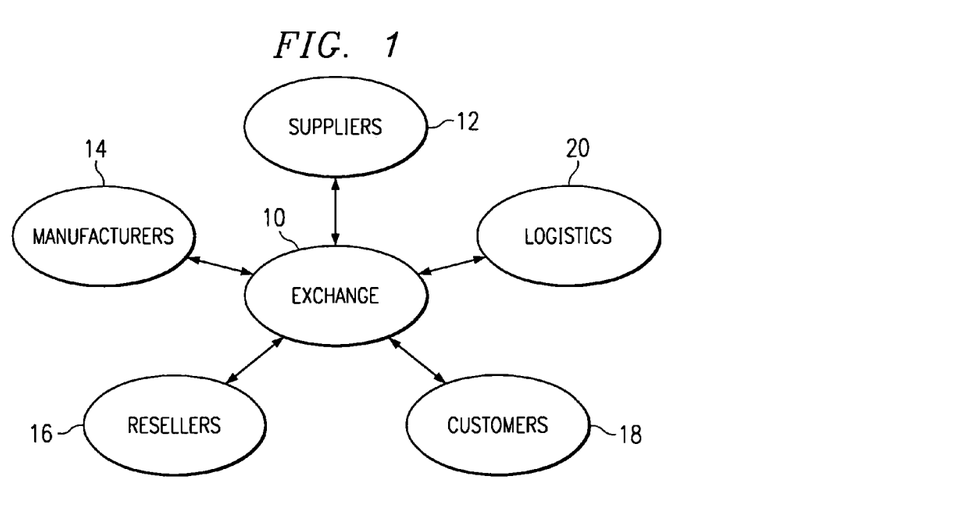
FIG. 1 is a high level diagram showing an exchange communication system for transacting business between numerous companies.

In the preferred embodiment, a centralized communications service, hereinafter referred to as an exchange 10, is provided in communication with numerous corporate computer systems. As shown in FIG. 1, users of the exchange are grouped into suppliers 12, manufacturers 14, resellers 16, customers 18, and logistics 20. It will be understood by those skilled in the art that each of these areas is represented by numerous companies. In addition, any one company may fall under different categories at different times. For example, a manufacturer may have numerous suppliers, each of which considers that manufacturer to be a customer. Each of the suppliers may in turn have suppliers of their own. Companies designated as resellers may be considered as suppliers to one manufacturer or customer, and customers to another. It will be understood that the functional groupings shown in FIG. 1 are for convenience only, and many relationships are not easily formed into a simplistic definition.

As contemplated by the present invention, the exchange service provides a mechanism for routing messages between companies. These messages can be formatted in numerous ways so that companies having disparate computer systems can communicate effectively. Preferably, the messaging system is independent of the system designs used by various companies, but the particular messaging system utilized does not itself form a part of the present invention.

As referred to in FIG. 1, those companies designated as logistics are generally shippers of physical items. Including shipment details in a communications network so that they can be accessed improves efficiency of the overall system.

Figure 2:
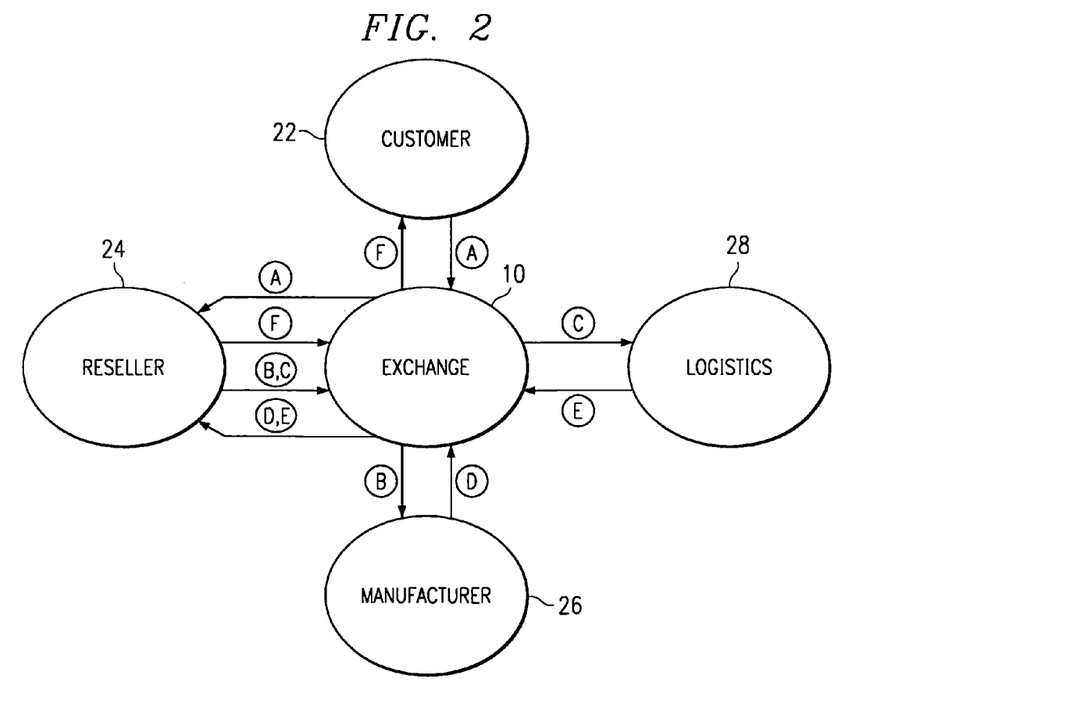
FIG. 2 is a dataflow diagram illustrating an exchange of messages between companies.

Referring to FIG. 2, an example is shown of a particular simple transaction to illustrate how the exchange works. In this extremely simple example, four separate companies are designated as customer 22, reseller 24, manufacturer 26, and logistics 28, or transportation. As described above, the relationships between these companies can change in the context of a different transaction.

In the transaction shown in FIG. 2, the customer 22 sends an order message A through the exchange 10 to reseller 24. This order can be a firm order, a request for a quotation, or similar request. In order to determine whether the order can be filled, and various terms such as shipping date, reseller 24 sends messages B and C to manufacturer 26 and logistics 28 respectively. Messages B and C pass through the exchange 10 to these companies. The manufacturer 26 determines the terms upon which it can supply the order, and returns message D through the exchange 10 to reseller 24. At the same time, the logistics company 28 determines availability of shipping, and returns message E with this information to reseller 24. In some transactions, shipping information may pass between manufacturer 26 and logistics company 28, with shipping being a part of message D returned from manufacturer 26 to reseller 24.

In the present example, reseller 24 determines availability in terms of the order based upon a promise from the manufacturer 26. In addition, shipping date and terms are determined. This information is placed into message F, which is returned through the exchange 10 to customer 22.

In this example, placing an order and the relationships between various companies are straightforward. However, use of the exchange 10 becomes more valuable if it can contain intelligence of its own, and perform more complex tasks.

For example, with access to many suppliers, customers will often want to request quotes from several suppliers, or possibly even select one or more suppliers through an auction or similar process. This can involve the customer placing an order to a shared location in a manner that is available to all interested suppliers. Any supplier who wishes to bid on the order can do so, and the exchange can handle collecting quotes and making it available to the customer as is described below.

In a similar manner, suppliers can automate, or partially automate, the interface between themselves and their potential customers. When orders are placed, simple orders can be responded to automatically. For example, in the same communications sequence given above in FIG. 2, messages B and C generated by reseller need not be generated as the result of human interaction. Instead, if this order is one of a standard type which fits certain parameters, as selected by reseller 24, messages B and C can be generated automatically upon receipt of a qualifying order. This type of automated message handling can, of course, be provided independently by the reseller, but in the preferred embodiment of the present invention certain functions are available within the exchange itself. This provides enhanced flexibility and service to companies using the exchange, with minimum software generation requirements for these companies.

The exchange itself is depicted in the drawings as a single, central object. However, in reality it will be a multi-part, highly distributed service. Insofar as the various users are concerned, the exchange will look like a single object in the same manner that most users view the Internet today. However, the various pieces of the exchange will be located on a large number of systems, providing capacity, flexibility, and system robustness. Preferably, backup devices and fault tolerant systems are provided using techniques known in the art.

Figure 3:
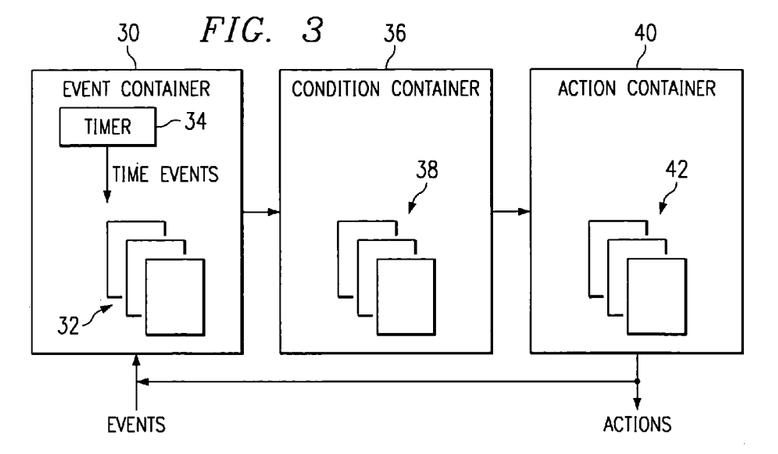
FIG. 3 is a block diagram showing the structure of a preferred event-condition-action control system.

Referring to FIG. 3, a logical structure for message handling within the exchange is shown. Not all messages passed through the exchange will need to be handled in this manner; however, in the preferred embodiment most or all messages are treated in the same way to simplify the design. Preferably, all messages are treated as events, as will now be described.

Conceptually, handling of messages within the exchange is broken into three parts. An event container 30 accepts incoming events (messages) 32, and stores date and time information about them. As described below, event container 30 preferably contains a timer 34, enabling time sensitive events to be handled. A condition container 36 contains instances of conditions 38, which are generally supplied by users of the system. An action container 40 contains instances of actions 42, which are also generally supplied by users.

When a user desires the exchange to perform an intelligent response or filtering, a message is sent. For example, if a customer wishes to obtain goods to supply an order, a request for quotes message can be sent to the appropriate companies, or posted to a central location made available in the exchange. Replies to the message, which will consist of quotations by various suppliers, will be accepted as events by the exchange and handled in a manner designated by the center of the original message. All messages 32 come into the event container 30, and are stored there for further processing.

The timer 34 is used to generate events related to the clock or the calendar. If, for example, the customer wants to consider only bids which are submitted within a particular time window, responsive messages are time stamped and compared with timing events generated by the timer 34.

Within the condition container 36 are numerous instances of conditions 38 which have been defined by users of the exchange. In the example of a customer putting an order out for bids, conditions regarding receipt of those bids, for example, can be defined as condition instances. Any type of condition desired by the customer can be implemented in the conditions instances. These are implemented as logical relationships between characteristics of the events, such as time, number, and value of various parameters. For example, the customer could want to consider only the first three responsive events, or only responses returned before close of business on the same day as the request, and so forth. These types of logical conditions are expressed in the condition instances as is described below in more detail.

The action container 40 contains instances of actions 42 which are to occur in response to conditions being met. Typically, the actions will be to generate additional events. In such case, actions which occur are also returned as events to the event container 30.

Breaking the function of the exchange into these three conceptual blocks allows many changes to be made dynamically. For example, changes can be made to conditions without affecting events which have already occurred. Because events are stored in the event container, conditions can be modified as desired by the user without impacting the event container. As is described further below, once a condition, whether original or modified, has been met, the events fulfilling that condition are removed from the event container 30.

In a similar manner, actions can be changed independently of events or conditions. When a condition instance is changed, it will be common to change the corresponding action instance. However, these two sets of instances are not tightly tied together, and may be modified independently.

Each container utilizes a listener to watch for incoming events. This will typically be interrupt driven, so that something will be done within the container when the listener detects that an event has arrived. Within the event container, the events are stored and catalogued. Additionally, conditional determinations may be made as described below. In the condition container, when an event arrives from the event container, the condition framework, or engine, determines which conditions may be affected by the event. There may be more than one such condition. The framework then determines whether any of the potentially affected conditions are satisfied, and if so an event is sent to the action container.

Within the action container, receipt of an event by the listener causes the appropriate action or actions to be performed. As described above, some of these actions will be the generation of an event which is returned to the event container, where they are detected by the event listener.

Figure 4:
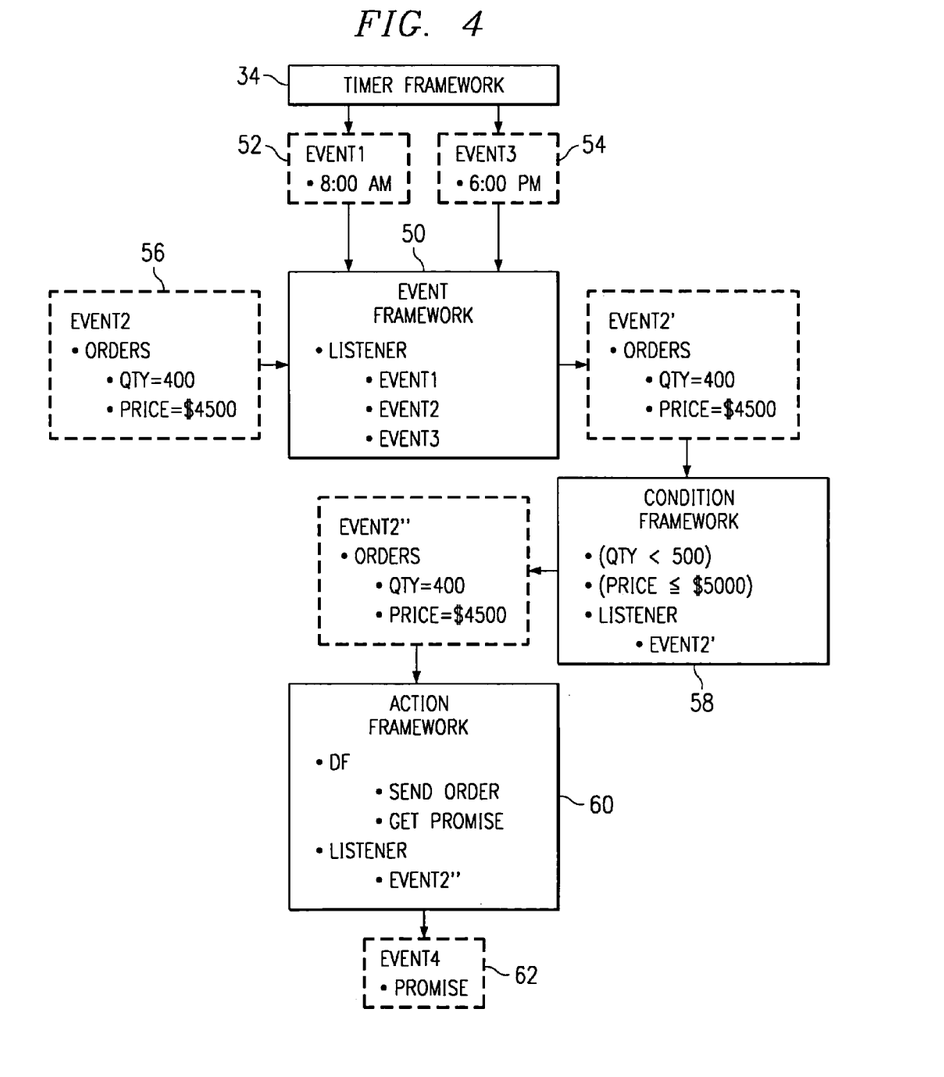
FIGS. 4 and 5 are block diagrams illustrating examples of how the preferred embodiment functions.

FIG. 4 is an example illustrating how the exchange functions in a simple instance. In this example, a business can automatically accept simple orders within certain parameters, and send a return message to the customer promising fulfillment of the order. In the example of FIG. 4, orders are to be processed only between 8:00 a.m. and 6:00 p.m. This rule, referred to as an Event-Condition-Action (ECA) rule, is set up to deal with a certain specific case. Other ECA rules would be setup for other ordering conditions.

Referring to FIG. 4, an event framework 50 is an operational portion of the event container. It contains a listener, which constantly scans for events. The timer 34 generates timing events, 52, 54 which are recognized by the event framework 50. In other words, the event framework is aware of the current time. In the present case, incoming events are only to be processed between the hours of 8:00 a.m. and 6:00 p.m.

In the preferred embodiment, the event framework contains conditions in addition to those contained in the condition container. Conditions in the event container are preferably a small subset of possible conditions, directed to timing and counting of events. Thus, a rule within the event framework can provide that a message is sent to the condition container only if an order is received between the timed events of 8:00 a.m. and 6:00 p.m. Another type of condition preferably implemented in the event framework is an event counting condition, such as "take an action once three proposals have been received." Such counting of events is preferably a task performed within the event container. If desired, all of these timing and counting conditions could be implemented in the condition container, but in a large system, the condition container will generally contain many complex conditions set up by system users. Low level decisions, such as time related or count related decisions, can easily be implemented within the event container without adding to the complexity already inherent in the large number of conditions in the condition container.

Event2 56 is an order by a customer which has a quantity of 400, and a price of $4,500. The listener of the event framework 50 recognizes the occurrence of Event2, and determines that it occurs between Event1 (8:00 a.m.) and Event3 (6:00 p.m.). It therefore generates an Event2', containing the terms of the order, and sent to the condition container. If, as described above, the time related conditions are instead implemented in the condition container, the just described condition would be processed there.

The condition instance 58 in the condition container, set up by the company accepting orders, specifies that this condition is triggered if an order comes in having a quantity less than 500, and a price less than $5000. Once the listener within the condition framework notices the occurrence of Event2', which meets these conditions, Event2" is generated. Event2" is an order having the previously noted quantity and price. Event2" is sent to the action instance 60, which defines the actions to be taken when such an order is received. Once the listener within the action container notes the occurrence of Event2", a promise to fulfill the order is obtained and the order is sent to the company for processing. Event4 62 is generated, which is a return promise back to the customer. The customer will presumably provide its own conditions for handling a promise such as Event4, but the message may simply be forwarded by the system to be handled by a person in the usual way.

Figure 5:
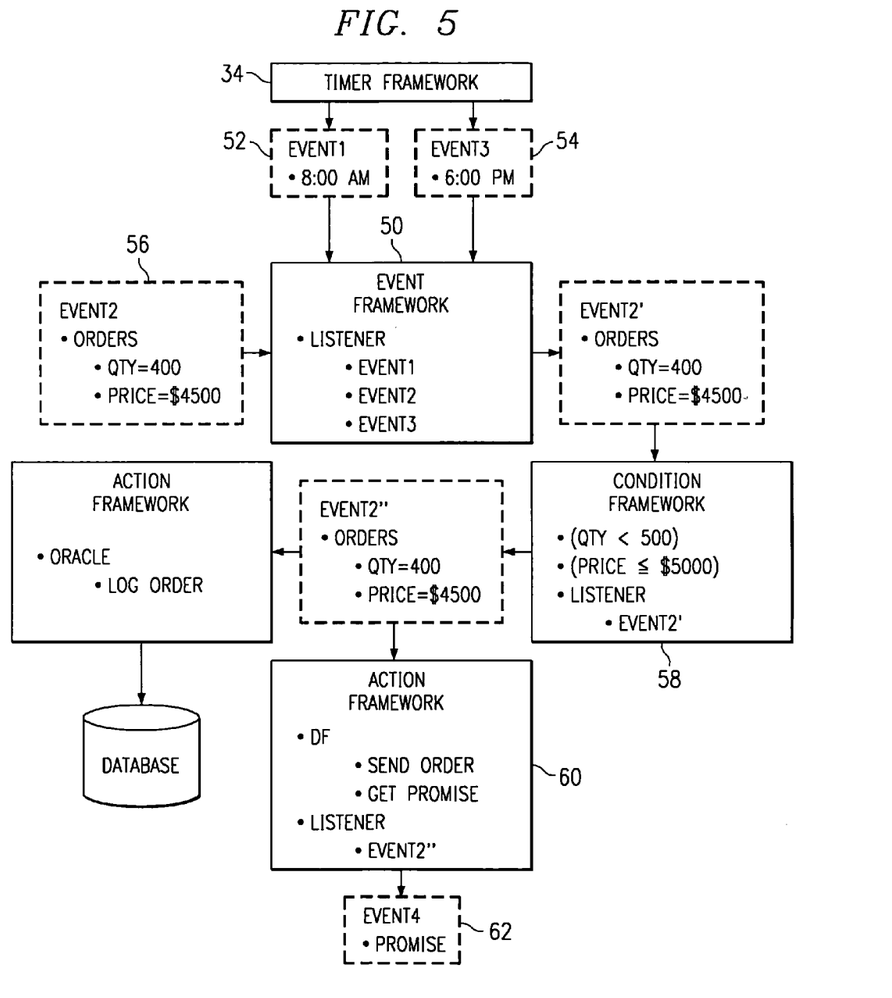

Referring to FIG. 5, the same situation is illustrated, except that two separate actions are connected to this condition instance. In addition to the action 62 described in connection with FIG. 4, an additional action 64 is provided which logs the order to a database 66 so that it is available to the company. Any number of actions may be attached to a single condition instance.

As mentioned earlier, when an event occurs that event is remembered within the system until it is used and explicitly removed. In other words, the event persists within the system, and is not lost due to changes and conditions or actions. For example, if a customer wishes to accept ten bids on an order before making a decision, an ECA rule can be set up which reports the bids only after ten are received. If the customer changes his mind at some point, that rule can be modified to generate an action when, for example, only five bids are received. Each incoming message is an event, and changing the condition does not lose any bids already in the system. In other words, each event is held within the event container until the condition container indicates that each of the corresponding events has been used to fulfill a condition and generate an action. Only at that time are events removed from the event container. Events are preferably defined to expire within some selected time period, such as a few days, so the event container does not become clogged with unused events. Expiration is a time-related condition which operates in the normal manner, to delete messages which have a date stamp older than a desired value.

Persistence allows many changes to be made to the system dynamically, without interrupting running of the system. For example, if the customer decides that, in addition to the regular notification, a certain manager is to be notified via pager that the requisite number of bids have been received, an action can simply be added corresponding to the condition instance to send a message to a designated pager. Even if this type of capability is not present on the system initially, once the capability is added action instances may be modified to take advantage of it. This allows the system to grow dynamically in response to user demands and the availability of new technology.

Conceptually, the internal logic within the condition container and the event container utilizes the concept of "petri-nets". As is known in the art, this is a conceptual framework which allows for generation of actions in response to asynchronous events, and persistence in the manner described above. Simple examples of petri-nets are shown in FIGS. 6-8, and will be recognized by those familiar with this technology.

Figure 6:
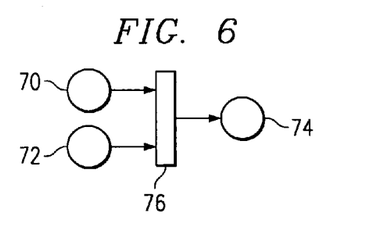
FIGS. 6, 7, and 8 are petri-net examples illustrating operation of control logic of the preferred embodiment.

Referring to FIG. 6, a simple petri-net which corresponds to the conjunction of two events generating an action is shown. The first and second event, represented by circles 70 and 72, correspond to "places" in petri-net terminology. Action event 74 also corresponds to a place. The condition instance 76 corresponds to a transition. In FIG. 6, the transition occurs if both the first and second events have occurred, causing the resulting action 74 to be generated. The first two places correspond to events received by the event container, and the resulting place corresponds to an event generated by an action instance.

Figure 7:
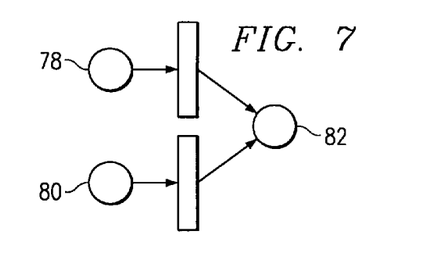

FIG. 7 shows a similar petri-net diagram, with the first and second events 78, 80 being combined in a logical or operation. If either event occurs, the resulting action event 82 is generated.

Figure 8:
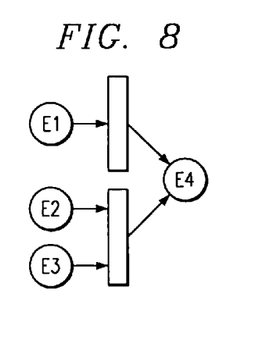

FIG. 8 shows an event that is a composite of composite events. As will be appreciated by those skilled in the art, nets-nets can be logically combined to any level of complexity to define the desired condition. FIG. 8 shows a petri-net for (E1 or (E2 and E3)). In other words, an E4, corresponding to an event generated by an action instance, is generated when either E1 or both of E2 and E3 occur.

Manipulation of petri-nets calls for tokens to be placed in various places. When all of the places which provide an input to a transition are filled, these tokens are all removed and tokens are placed in all output places. This corresponds conceptually to the generation of persistent events in the event container, followed by removal of these events and generation of action events as described above. A transition corresponds to a condition instance, and output places correspond to actions. Conceptually, a petri-net separates inputs from outputs, in a manner similar to separation of ECA events into the three separate event, condition and action containers.

Figure 9:
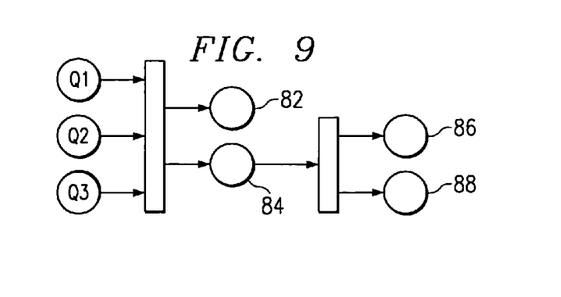
FIG. 9 is a petri-net illustrating control flow in a transaction example.

FIG. 9 is a more complex petri-net representing a condition similar to the request for three quotes described above. In this set of conditions, the customer desires to make a selection only when three separate quotes have been submitted in response to a request. When each of the quotes Q1, Q2, and Q3 have been submitted, a transition occurs which generates two output actions 84, 86. The first output action 84 is an acknowledgement to all who have submitted quotes that the quotes have been received, and the second output action 86 is submission of the quotes to a selection process. This may be automated, or may be reported to a person to make decision as to which quote is to be accepted. If selection is automated, the selection may be as complex as necessary. The selector second output action 86 represents activity which may take place out of the exchange, by sending appropriate messages to the company which will be returned when a decision has been made. Once a decision has been made and returned to the exchange, the selector place 84 will be filled by a token, which will initiate the second transition. Outputs from the second transition are, in this example, to enter an order with the company providing the winning quote 88, and to send a notice of non-acceptance to the others 90.

It will be appreciated that this petri-net corresponds to the logic of the exchange controller. Quotes Q1, Q2, and Q3 correspond to messages sent to the exchange in response to a bid. The condition defined by the customer requires three quotes to be submitted before a decision is made, so that acknowledgement of the submissions and initiation of the selection process, are made only after three quotes are received. As described above, counting three quotes is preferably done in the event container, but could be implemented in the condition container if desired. The selection process can be as simple or as complex as desired by the customer, and can be entirely automated or entirely manual. Once the customer makes a selection, an event is sent to the exchange which corresponds to the selection node. This triggers a second condition instance, which generates the order and sends a notice of non-acceptance to the losing bids.

Because actions can generate events which are used to satisfy other conditions, the relatively simple conceptual structure of the Event-Condition-Action logical control for the exchange can be used to perform quite complex behavior. The system itself is very simple, it simply responds to events which occur. If no events occur, the exchange logic control does nothing. As events occur, however, any number of resulting events may be directly or indirectly generated and fed back through additional condition instances. With minimal effort, the user can describe desired actions to be taken by the exchange, and it will handle many routine tasks associated with message passing through the exchange.

The system described above provides an intelligent, dynamically modifiable control system for dealing with messages in a common exchange. Users may define conditions at any time, and receipt of messages (events) triggers actions when various conditions are met. By separating receipt of messages, conditions, and actions into three separate containers, system flexibility is greatly enhanced. Modifications to conditions, actions, or both may be made any time. The conditions may be expressed as simple text statements, and interpreted at execution time by the condition framework. In this manner, event handling, conditions, and actions are not compiled in as part of the system, but are rather data which are used by the system to perform actions as messages are received.

It will be appreciated by those skilled in the art that the described system can grow into a network having great complexity and flexibility. Although three containers are conceptually shown, many sets of three containers may be actually implemented on multiple computer systems tied together into the network. Each message will have an address showing where it is supposed to go, and will be directed to the appropriate system, and therefore the appropriate event container, by this address. This is similar to the manner in which message are currently communicated over the internet based upon addressing information contained in a header of the message.

While the invention has been particularly shown and described with reference to a preferred embodiment, it will be understood by those skilled in the art that various changes in form and detail may be made therein without departing from the spirit and scope of the invention.

What is claimed is:

1. A computer-implemented communications exchange using one or more computer systems for facilitating communication among a plurality of supply chain participants in an electronic marketplace to facilitate one or more marketplace transactions, comprising:

a communication interface for sending and receiving messages among the plurality of supply chain participants in the electronic marketplace to facilitate one or more marketplace transactions;

an event container connected to the communication interface for receiving messages from the communication interface as events, one or more of the messages and their corresponding events each being associated with one or more marketplace transactions;

a condition container connected to the event container, the condition container comprising a plurality of condition instances each specifying one or more rules for determining whether to initiate an action defined by an action instance associated with the condition instance, a particular condition instance specifying whether to initiate the action defined in the associated action instance to facilitate one or more marketplace transactions in the electronic marketplace; and an action container connected to the condition container and containing a plurality of action instances, each action instance associated with one or more of the condition instances for defining an action to, when initiated, facilitate one or more marketplace transactions in the electronic marketplace;

when one or more events received by the event container from the communication interface are determined to match a predicate of a particular condition instance, the action, defined in the action instance associated with the particular condition instance, is initiated by the communications exchange to facilitate the one or more marketplace transactions associated with the one or more events determined to match the predicate of the particular condition instance, wherein at least one of the condition instances specifies at least one rule requiring the presence of a specified plurality of specified events in the event container for initiating a specified one of the action instances in the action container, wherein each event is defined to expire within a respective selected time period if unused, and wherein each specified event is stored in the event container only until one of the following occurs:
the condition instance initiating the specified event, or expiration of the specified event.

2. The exchange of claim 1, wherein the event container comprises a timer for generating events related to time.

3. The exchange of claim 1, operable to:
interpret the condition instances at run time; and
change the condition instances in response to user input while the exchange is operating without disrupting processing of events.

4. The exchange of claim 1, wherein at least one of the plurality of action instances generates a new event when the action defined by the action instance is initiated, the new event being sent to the event container.

5. The exchange of claim 1, wherein the messages sent and received by the communication interface comprise one or more of:
a request for a quote;
a quote;
shipping information;
product availability information;
delivery information; and
a firm order.

6. The exchange of claim 1, wherein the electronic marketplace comprises one or more of:
customers;
resellers;
suppliers;
manufacturers; and
logistics providers.

7. The exchange of claim 1, operable to:
receive definitions of condition instances from supply chain participants of the exchange; and
associate the definitions of condition instances with the condition container such that the supply chain participants of the exchange may delegate certain decisions to the exchange.

8. The exchange of claim 1, wherein one or more of the messages are initiated by a supply chain participant.

9. The exchange of claim 1, wherein one or more of the messages are initiated by particular action contained in the action container.

10. The exchange of claim 1, wherein:
in response to input from a user, the communications exchange dynamically modifies a specified condition in the condition container independent of events in the event container and actions in the action container; and
in response to input from the user, the communications exchange dynamically modifies a specified action in the action container independent of events in the event container and conditions in the condition container.

11. A communication system for facilitating communication among a plurality of supply chain participants in an electronic marketplace to facilitate one or more marketplace transactions, comprising:
a communications exchange in communication with the plurality of supply chain participants;
a communication interface for sending and receiving messages among the plurality of supply chain participants in the electronic marketplace to facilitate the one or more marketplace transactions;
an event container connected to the communication interface for receiving messages from the communication interface as events, one or more of the messages and their corresponding events each being associated with one or more marketplace transactions;
a condition container connected to the event container, the condition container comprising a plurality of condition instances each specifying one or more rules for determining whether to initiate an action associated with an action instance associated with the condition instance, a particular condition instance specifying whether to initiate the action defined in the associated action instance to facilitate one or more marketplace transactions in the electronic marketplace; and
an action container connected to the condition container and containing a plurality of action instances, each action instance associated with one or more of the condition instances for defining an action to, when initiated, facilitate one or more marketplace transactions in the electronic marketplace;
when one or more events received by the event container from the communication interface are determined to match a predicate of a particular condition instance, the action, defined in the action instance associated with the particular condition instance, is initiated by the communications exchange to facilitate the one or more marketplace transactions associated with the one or more events determined to match the predicate of the particular condition instance,
wherein at least one of the condition instances specifies at least one rule requiring the presence of a specified plurality of specified events in the event container for initiating a specified one of the action instances in the action container,
wherein each event is defined to expire within a respective selected time period if unused,
wherein each specified event is stored in the event container only until one of the following occurs:
the condition instance initiating the specified event, or expiration of the specified event;
in response to input from a user, the communications exchange dynamically modifies a specified condition in the condition container independent of events in the event container and actions in the action container; and
in response to input from the user, the communications exchange dynamically modifies a specified action in the action container independent of events in the event container and conditions in the condition container.

12. The system of claim 11, wherein the event container of the communications exchange comprises a timer for generating events related to time.

13. The system of claim 11, wherein the exchange is operable to:
interpret the condition instances at run time; and
change the condition instances in response to user input while the exchange is operating without disrupting processing of events.

14. The system of claim 11, wherein at least one of the plurality of action instances generates a new event when the action defined by the action instance is initiated, the new event being sent to the event container.

15. The system of claim 11, wherein the messages sent and received by the communication interface comprise one or more of:
   a request for a quote;
   a quote;
   shipping information;
   product availability information;
   delivery information; and
   a firm order.

16. The system of claim 11, wherein the electronic marketplace comprises one or more of:
   customers;
   resellers;
   suppliers;
   manufacturers; and
   logistics providers.

17. The system of claim 11, wherein the exchange is operable to:
   receive definitions of condition instances from supply chain participants of the exchange; and
   associate the definitions of condition instances with the condition container such that the supply chain participants of the exchange may delegate certain decisions to the exchange.

18. The system of claim 11, wherein one or more of the messages are initiated by a supply chain participant.

19. The system of claim 11, wherein one or more of the messages are initiated by a particular action contained in the action container.

20. A computer-implemented method for using one or more computer systems for facilitating communication among a plurality of supply chain participants in an electronic marketplace to facilitate one or more marketplace transactions, comprising:
   providing a plurality of condition instances each associated with one or more events and specifying one or more rules for determining whether to initiate an action defined in an action instance associated with the condition instance, each action instance being associated with one or more of the condition instances and defining an action, a particular condition instance specifying whether to perform an action defined in the action instance associated with the particular condition instance, the action defined by the action instance associated with the particular condition instance for facilitating, when initiated, one or more marketplace transactions in the electronic marketplace;
   receiving a plurality of messages, each message being treated as an event, one or more of the messages and their corresponding events each being associated with one or more marketplace transactions, the plurality of messages being stored in an event container;
   determining whether the particular condition instance is satisfied by determining whether one or more of the messages received as events matches the predicate of the particular condition instance; and
   if it is determined that one or more messages received as events satisfies the particular condition instance, initiating the action defined in the action instance associated with the particular condition instance to facilitate the one or more marketplace transactions associated with the one or more events determined to match the predicate of the particular condition instance in the electronic marketplace,
   wherein at least one of the condition instances specifies at least one rule requiring the presence of a specified plurality of specified events in the event container for initiating a specified one of the action instances,
   wherein each event is defined to expire within a respective selected time period if unused, and
   wherein each specified event is stored in the event container only until one of the following occurs:
      the condition instance initiating the specified event, or expiration of the specified event.

21. The method of claim 20, further comprising:
   generating timing events; and
   determining that one or more messages interpreted as events satisfies the condition using at least one timing event combined with an event which is not a timing event.

22. The method of claim 20, wherein the conditions are interpreted at run time, whereby changes to the conditions can be made while a computer system is executing.

23. The method of claim 20, wherein:
   the condition is associated with more than one action; and
   if it is determined that one or more messages interpreted as events satisfies the condition, initiating the more than one actions associated with the condition.

24. The method of claim 20, wherein the messages sent and received comprise one or more of:
   a request for a quote;
   a quote;
   shipping information;
   product availability information;
   delivery information; and
   a firm order.

25. The method of claim 20, wherein the electronic marketplace comprises one or more of:
   customers;
   resellers;
   suppliers;
   manufacturers; and
   logistics providers.

26. The method of claim 20, wherein providing a plurality of conditions comprises:
   receiving definitions of condition instances from supply chain participants of a communications exchange; and
   associating the definitions of condition instances with a condition container such that the supply chain participants of the communications exchange may delegate certain decisions to the communications exchange.

27. The method of claim 20, wherein one or more of the messages are initiated by a supply chain participant.

28. The method of claim 20, wherein one or more of the messages are initiated by a particular action contained in an action container.

29. The method of claim 20, wherein:
   in response to input from a user, dynamically modifying a specified condition independent of events associated with the specified condition and actions associated with the condition; and
   in response to input from the user, dynamically modifying a specified action independent of events associated with the action and conditions associated with the action.

30. Software for facilitating communication among a plurality of supply chain participants in an electronic marketplace to facilitate one or more marketplace transactions, the software embodied in a computer-readable medium and when executed operable to:

provide a plurality of condition instances each associated with one or more events and specifying one or more rules for determining whether to initiate an action defined in an action instance associated with the condition instance, each action instance being associated with one or more of the condition instances and defining an action, a particular condition instance specifying whether to perform an action defined in the action instance associated with the particular condition instance, the action defined by the action instance associated with the particular condition instance for facilitating, when initiated, one or more marketplace transactions in the electronic marketplace;

receive a plurality of messages, each message being treated as an event, one or more of the messages and their corresponding events each being associated with one or more marketplace transactions, the plurality of messages being stored in an event container;

determine whether the particular condition instance is satisfied by determining whether one or more of the messages received as events matches the predicate of the particular condition instance; and     if it is determined that one or more messages received as events satisfies the particular condition instance, initiating the action defined in the action instance associated with the particular condition instance to facilitate the one or more marketplace transactions associated with the one or more events determined to match the predicate of the particular condition instance in the electronic marketplace,     wherein at least one of the condition instances specifies at least one rule requiring the presence of a specified plurality of specified events in the event container for initiating a specified one of the action instances,     wherein each event is defined to expire within a respective selected time period if unused, and     wherein each specified event is stored in the event container only until one of the following occurs:
        the condition instance initiating the specified event, or expiration of the specified event.

31. The software of claim 30, further operable to:
generate timing events; and
determine that one or more messages interpreted as events satisfies the condition using at least one timing event combined with an event which is not a timing event.

32. The software of claim 30, wherein the conditions are interpreted at run time, whereby changes to the conditions can be made while a computer system is executing.

33. The software of claim 30, wherein:
the condition is associated with more than one action; and
if it is determined that one or more messages interpreted as events satisfies the condition, initiating the more than one actions associated with the condition.

34. The software of claim 30, wherein the messages sent and received comprise one or more of:
a request for a quote;
a quote;
shipping information;
product availability information;
delivery information; and
a firm order.

35. The software of claim 30, wherein the electronic marketplace comprises one or more of:
customers;
resellers;
suppliers;
manufacturers; and
logistics providers.

36. The software of claim 30, wherein providing a plurality of conditions comprises:
receiving definitions of condition instances from supply chain participants of a communications exchange; and
associating the definitions of condition instances with a condition container such that the supply chain participants of the communications exchange may delegate certain decisions to the communications exchange.

37. The software of claim 30, wherein one or more of the messages are initiated by a supply chain participant.

38. The software of claim 30, wherein one or more of the messages are initiated by a particular action contained in an action container.

39. The software of claim 30, wherein:
in response to input from a user, dynamically modifying a specified condition independent of events associated with the specified condition and actions associated with the condition; and
in response to input from the user, dynamically modifying a specified action independent of events associated with the action and conditions associated with the action.

\* \* \* \* \*